June 20, 1972 F. L. DERROR 3,671,160
APPARATUS FOR A SYSTEM TO EXTRICATE INTRICATE, CERAMIC SHAPES
FROM MULTIPLE PIECE MOLDS
Filed Oct. 13, 1969 9 Sheets-Sheet 1

INVENTOR.
FRED L. DERROR
BY Hamilton, Cook.
Renner & Kenner
ATTORNEYS

FIG. 3

INVENTOR.
FRED L. DERROR
BY Hamilton, Cook,
Renner & Kenner
ATTORNEYS

INVENTOR.
FRED L. DERROR
BY Hamilton, Cook,
Renner & Kenner
ATTORNEYS

INVENTOR.
FRED L. DERROR
BY Hamilton, Cook,
Renner & Kenner
ATTORNEYS

June 20, 1972   F. L. DERROR   3,671,160
APPARATUS FOR A SYSTEM TO EXTRICATE INTRICATE, CERAMIC SHAPES
FROM MULTIPLE PIECE MOLDS Filed Oct. 13, 1969    9 Sheets-Sheet 9

INVENTOR.
FRED L. DERROR
BY Hamilton, Cook,
Renner & Kenner
ATTORNEYS

United States Patent Office 3,671,160
Patented June 20, 1972

3,671,160
APPARATUS FOR A SYSTEM TO EXTRICATE INTRICATE, CERAMIC SHAPES FROM MULTIPLE PIECE MOLDS
Fred L. Derror, Lucas, Ohio, assignor to Mansfield Sanitary, Inc., Perrysville, Ohio
Filed Oct. 13, 1969, Ser. No. 865,863
Int. Cl. B28b 21/08
U.S. Cl. 425—161
12 Claims

ABSTRACT OF THE DISCLOSURE

Apparatus for extricating an intricate ceramic casting from a multiple piece mold. This concept is adapted for use with multiple piece molds which have at least two, opposed, side sections that form a cradle by which the casting may be supported. The cradle is grasped and subsequently positioned at a receiving locus. So positioned, the support for the weight of the casting is shifted from the cradle onto a bat in order that the casting will float within the cradle. Thereafter, the sections of the mold forming the cradle are separated to extricate the casting therefrom. For some ceramic shapes it is highly desirable to invert the cradle prior to the deposit of the casting at the receiving locus. The subject concept includes such a method step. The apparatus disclosed comprises a carriage on which a plurality of multiple piece molds may be supported, means to separate the cradle from any other sections of the mold, an inversion mechanism for turning the cradle upside down, gripper means to grasp the cradle, transfer means within which the gripper means is supported and by which the cradle can be moved from the inversion mechanism to a receiving locus, a lift means at the receiving locus by which the support for the weight of the casting may be shifted from the cradle onto a bat and actuating means by which the gripper means—and thus the mold sections forming the cradle—can be separated after the weight of the casting is fully supported on the bat.

BACKGROUND OF THE INVENTION

The present invention relates generally to an improved system employed in the manufacture of slip cast, hollow, ceramic shapes—particularly the extrication of intricate, or unusual, shapes such as the outer shell of a water closet from the multiple piece mold in which it was cast.

Prior known methods of slip casting hollow, ceramic shapes have been virtually unchanged over many centuries. The use of forming means, such as molds and cores, to cast hollow, ceramic shapes is ageless. The molds and cores to form items such as the shell of a toilet have historically been supported on benches, but this "bench casting" technique requires spacious areas for casting and drying a shape if it has any appreciable size and if it is to be made in any appreciable number.

Excessive floor space has been required not only to accommodate the bulk of the molds and cores but also to permit access to each mold for insertion and removal of the core as well as sufficient room for the artisan to dust the molds and cores, pour the slip, withdraw the green castings from the molds, and perform the other steps required to prepare the casting before it is sent to the finisher for smoothing, deburring, and glazing just prior to firing in the ovens.

The "System for Slip Casting Hollow Ceramic Shapes" disclosed in my prior United States patent, No. 3,189,971, permitted the various steps in the slip casting process to be successively performed at individual stations. Briefly, the improved system taught by that patent employs a plurality of carriages that are movable along a closed circuit trackway for selective positioning at various sequentially located stations—e.g., the stations where: the core is inserted into the molds; the molds are filled with slip; the cast takes place; the cores are removed; the cores are dusted; the hollow shapes are further dried; the green castings are removed from the molds; and, the cores and molds are dried prior to recycling through the system.

A system embodying the concept of U.S. Patent No. 3,189,971 has remarkable adaptability and can be readily accommodated to the manufacture of a host of hollow, ceramic shapes. However, the most efficient removal of the green casting from the mold has, heretofore, required the insertion of a lifting device into the casting that would controllably grasp the fragile green casting and lift it out of the mold. Such a "Means for Lifting Green Ceramic Castings" was first taught in my prior United States patent, No. 3,205,291. However, for the use of such an apparatus to remove a green casting the shape thereof must not only present suitable surfaces by which it can be grasped but also be such that it is capable of being withdrawn from the mold. With shapes in which the contour of the surface, or surfaces, formed by the mold and the convenient parting line for the mold do not permit a facile withdrawal of the green casting, some other method of removal is required. The shell of a toilet epitomizes a shape having outer contours that militate against its facile withdrawal from a mold.

Because of the contours presented by the outer surface of a toilet shell, tedious, time-consuming methods have been historically required merely to extricate this particular item from the mold in which it was cast.

One of the earliest methods for making a toilet, and that still most frequently employed, involves casting the shell, the flushing ring for the upper edge of the shell and the internal divider walls, or "pipe," separately. Thereafter, the separately cast pipe, flushing ring and shell are joined to form the toilet. These separately cast elements are joined by a thick slurry of liquid slip, often mixed with wheat germ, which is applied as a heavy bead along the joinder lines between elements. This bead material can be dried and fired with the assembled parts.

Of the several drawbacks to this procedure the one aspect which has virtually defined economical elimination has been the inordinate difficulty in effecting the removal of the shell from the mold in which it was cast.

Mechanized removal of the green cast shell is generally considered to be so impractical that the ancient bench casting techniques have been laboriously continued—the most successful attempt at mechanization heretofore has been the utilization of an assembly line in the nature of one or more conveyor belt whereby the molds and cores are transported to the various artisans. Otherwise, the work of the artisans has been performed in the age-old manner.

Briefly, the casting of the shell for a toilet is accomplished in a four-piece mold. That is, the mold has bilaterally symmetrical side portions, a separate foot portion and an upper core. The four pieces of the mold are rigidly secured together and liquid slip is fed into the mold cavity. Thereafter, sufficient time must be afforded to permit the liquid slip to "cast"—i.e., to lose its fluidity—after which the upper core is removed and the internal divider walls, or pipe, and flushing ring are joined to the green shell. The green casting, which is still contained within the side portions and foot portion of the mold—the mold remaining supported on the foot portion thereof—is permitted to green cure sufficiently that it can be carefully handled without deformation.

The clamps that hold the side portions together are then removed, and the mold is turned to rest on one side. In this position the foot and the upper side portion are carefully removed, after which a bat is gently presented against the flush ring and workmen—generally two being required—turn the casting, and the one remaining side portion of the mold, so that the casting is supported on the bat. The second side portion is then removed and the outer surface of the casting is smoothed, deburred and stored to await glazing and firing while "white curing." The molds are then reassembled and recycled.

SUMMARY OF THE INVENTION

It is, therefore, a primary object of the present invention to provide a system whereby an intricate, ceramic shape, such as the shell of a toilet, can be removed with facility from the multiple piece mold in which it is cast.

It is another object of the present invention to provide a carriage for a system, as above, for supporting multiple molds and which is adaptable to traverse a closed circiut, the various operations in the manufacture of the intricate hollow casting taking place at successive, independent stations along said circuit.

It is still another object of the present invention to provide a carriage, as above, that is adapted to support a multiple piece mold such as the four-piece mold (foot, bilaterally symmetrical side portions and an upper core) suitable for casting the outer shell of a toilet—the mechanism by which the support is effected being capable of locking the multiple pieces of the mold together and, selectively, releasing them, withdrawing the upper core and supporting it in spaced relation with respect to the casting retained within the remaining cavity formed by the conjoined side portions, or cradle, and foot.

It is yet another object of the present invention to provide an inversion mechanism adapted to grasp the side portions of the mold and maintain them conjoined as a cradle from the foot, maintain the cradle in spaced relation above the elevation of the foot and gently invert the cradle.

It is a further object of the present invention to provide a gripper mechanism grasping the cradle and either support it until, or permit it to be transferred to a position where, it is registered with a receiving locus at which point the gripper mechanism separates the side portions of the mold to deposit the casting on the receiving locus.

It is a still further object to provide a transfer mechanism that may be located at one or more stations along a circuit and on which the gripper means, as above, may be carried for cooperative interaction with the carriage.

It is an even further object of the present invention to provide a receiving locus cooperative with said transfer means, cradle and casting to shift the weight of the casting from its nestled retention by the cradle onto a bat at the receiving locus without imparting deleterious stresses to the fragile, green casting during the transfer—the casting being deposited on the bat in the position desired to overcome shrinkage stresses that could result in distortion.

It is an additional object of the present invention to provide a method whereby an intricate casting may be extricated from a multiple piece mold.

These and other objects, together with the advantages thereof over existing and prior art forms which will become apparent from the following specification, are accomplished by means hereinafter described and claimed.

In general, a system embodying the concept of the present invention for extricating intricate castings from a multiple piece mold may be advantageously utilized in conjunction with one or more carriages movable between individual stations for successively performing the various slip casting operations. One or more multiple piece molds would be mounted on each carriage, and each mold would have at least opposed side sections forming a cradle, in which the casting can be nestled for support in either an upright or an inverted position, and an additional number of sections as required to mold the particular shape desired.

An inversion mechanism is adapted to grasp the cradle, and, if necessary, allow the cradle, and casting nestled therein, to be elevated upwardly with respect to a foot portion of the mold. With the cradle supported in spaced relation upwardly of the foot a turning device cooperates to rotate the roll means of the inversion mechanism and thus invert the cradle and casting. Precise vertical orientation of the inverted cradle is desired for subsequent interaction with a gripper means and may be achieved by cooperative engagement of the roll means with a locator means through an outrigger means interposed therebetween.

Gripper means are provided on a transfer means to grasp the cradle, and the transfer means may be employed to transport the cradle to a receiving locus, at which point a modulated lift means shifts the weight of the casting—still within the cradle—from the cradle onto a bat, or the like, at the receiving locus. When the wieght of the casting is thus floating within the cradle the opposed sections forming the cradle are separated by the gripper means to extricate the casting therefrom.

After the casting has been extricated the opposed sections of the cradle may be moved away from the casting and reassembled on the carriage—with any other sections of the mold—for recycling.

A method embodying the concept of the present invention to extricate an intricate casting from a multiple piece mold also capitalizes upon the opposed side sections of the mold forming a cradle in which the casting is nestled for support in either an upright or an inverted position. Such a method basically involves grasping the cradle, and, with the casting nestled therein, shifting the weight of the casting from its support by the cradle onto a bat, or the like, and the side sections of the mold forming the cradle are the separated to extricate the casting.

One preferred embodiment of apparatus according to the concept of the present invention and capable of performing the method thereof is shown by way of example in the accompanying drawings without attempting to show all of the various forms and modifications in which the invention might be embodied; the invention being measured by the appended claims and not by the details of the specification.

DESCRIPTION OF THE PREFERRED EMBODIMENT

Figure 1:
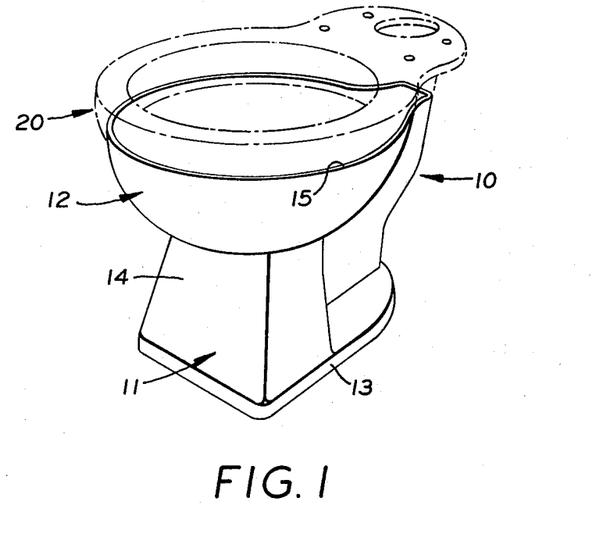
FIG. 1 is a frontal perspective of a toilet depicting, in solid line, the shell made according to the method and on apparatus embodying the concept of the present invention and further depicting, in chain line, the flushing ring as it would be oriented when joined to the shell.

Referring more particularly to the drawings, the present invention relates generally to a method and apparatus for extricating intricate, ceramic shapes such as the outer shell—indicated generally by the numeral 10 on the attached drawings and shown in solid line representation in FIG. 1—of a toilet. The shell 10 is comprised of a pedestal portion, indicated generally by the numeral 11, and a bowl portion, indicated generally by the numeral 12. The pedestal portion 11 has a base 13 adapted to rest on a floor for support and a support web 14, the frontal portion of which extends upwardly from the base 13 to intercept and lend support to the bowl portion 12. The rearward portion 14a of the support web extends upwardly to the level of the shell rim 15 and merges therewith.

Figure 2:
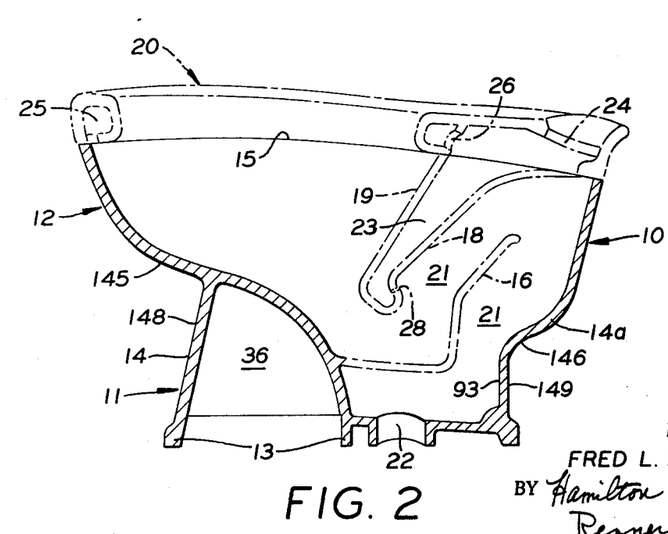
FIG. 2 is a longitudinal, vertical cross section of the toilet depicted in FIG. 1, also depicting, in solid line, the shell and further depicting, in chain line, the flushing ring joined to the upper edge of the shell and the interior walls defining the passageway for the admission of flush water and the passageway comprising the siphon-trap.
Figure 3:
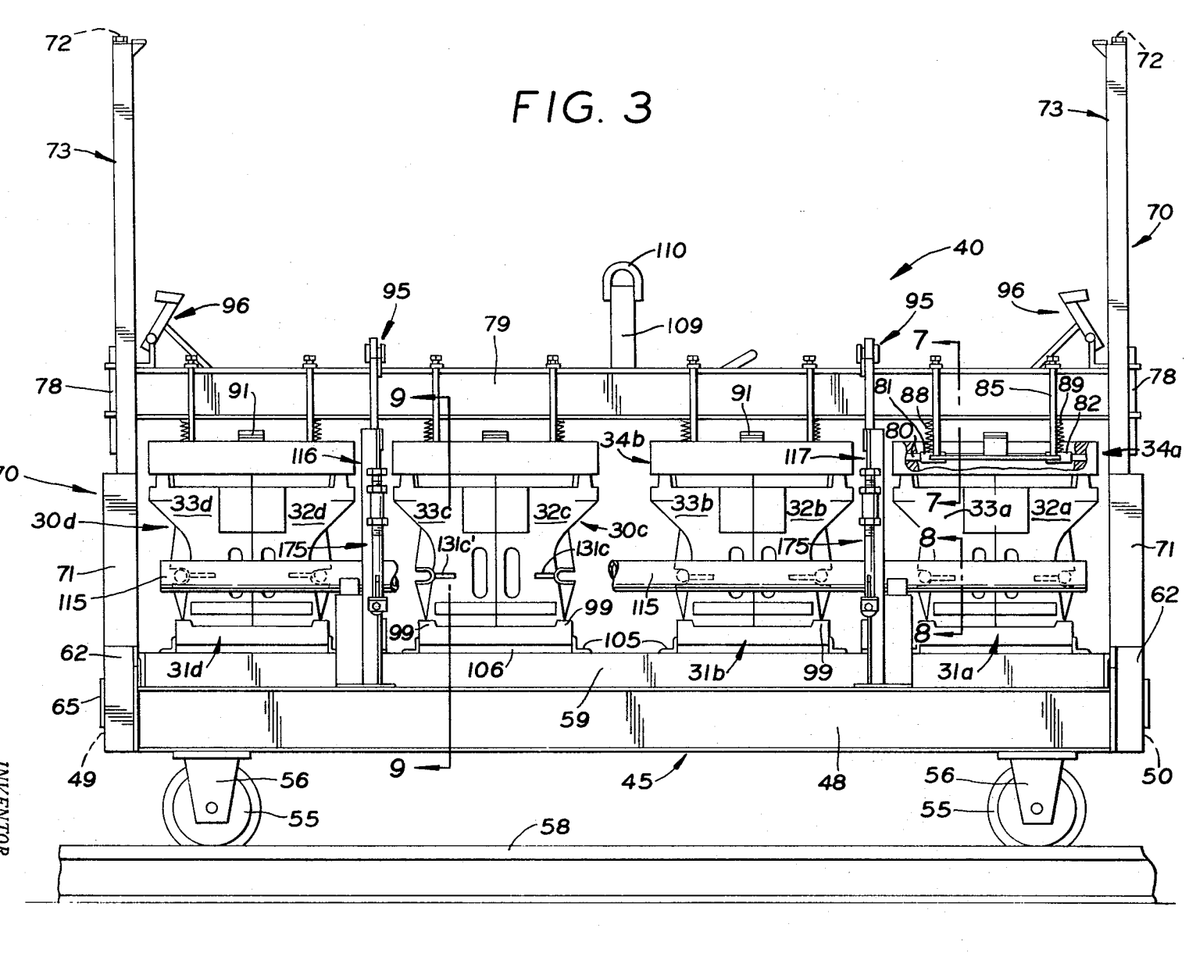
FIG. 3 is a side elevation, partly broken away and partly in section, of a typical carriage adapted for use in conjunction with a system embodying the concept of the present invention, the multiple piece molds supported on said carriage, and the carriage itself, being depicted as disposed when the multiple pieces of the molds are lockingly assembled.

The shell 10 is transformed into a water closet by the addition of the separately cast internal walls typified by walls 16, 18 and 19 and the flush ring 20. The internal walls 16 and 18 together with wall 16 and the rearward portion 14a of the support web delineate the siphon-trap passageway 21 that communicates between the bowl portion 12 and the exhaust port 22 through the base 13. Internal walls 18 and 19 converge downwardly to form a receiving cavity 23 therebetween. The flush water is supplied to the receiving cavity through inlet port 24 and flows into the annular passageway 25 within the flush ring 20 through a bore 26 in wall 19 and also flows outwardly through the siphon starting jet 28 during the flush to initiate siphoning discharge flow through the siphon-trap passageway 21. The intricate, exterior and interior contours of the shell 10 can be readily formed by a multiple piece mold indicated generally by the numeral 30 (FIG. 3).

Figures 5, 6:
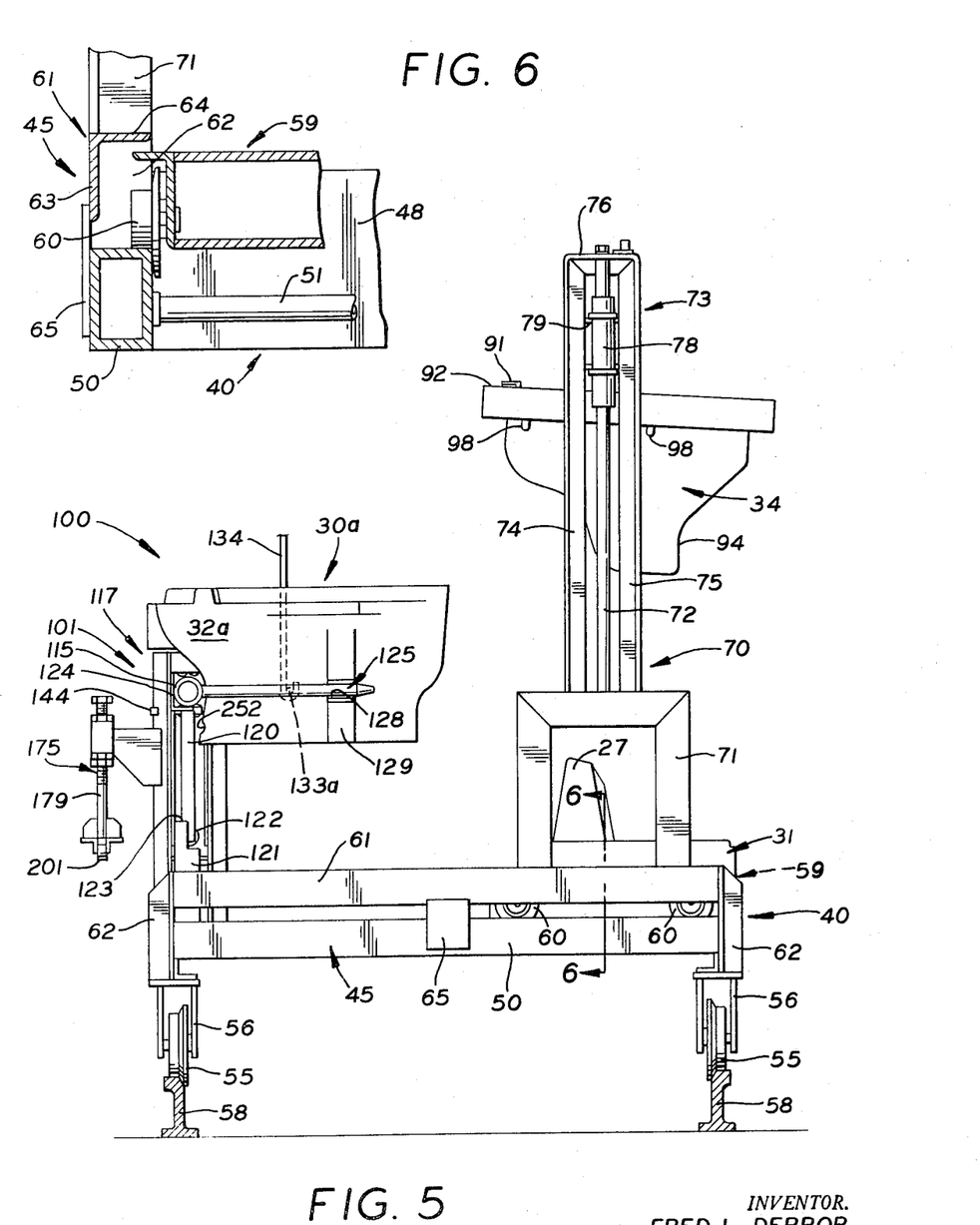
FIG. 5 is an end elevation of the carriage depicted in FIGS. 3 and 4, but depicting the core portion of the multiple piece mold vertically displayed from the position represented in FIGS. 3 and 4, as it would be after having been extracted therefrom, the two side portions, or cradle, of the mold being laterally displaced into engagement with the roll means of the inversion mechanism, the roll means, with the cradle supported thereon, having been vertically displaced to have withdrawn the cradle from the foot portion of the mold; and, the foot portion having been laterally translated to a position beneath the elevated cores.
FIG. 6 is an enlarged cross section taken substantially on line 6—6 of FIG. 5 depicting the interconnection of the carriage with the table supported thereon.

The mold 30 comprises a foot portion 31 (FIG. 5), bilaterally symmetrical side portions 32 and 33 (FIG. 3) and an upper core 34 (FIG. 5). The foot portion 31 forms the downwardly directed surfaces of the base 13 and includes a lower core portion 27 that forms the blind cavity 36 (FIG. 2) that opens downwardly between the support web 14 and the bowl portion. The side portions 32 and 33 form the exterior surfaces of the shell 10, and the upper core 34 forms the interior surface of the shell.

Figure 7:
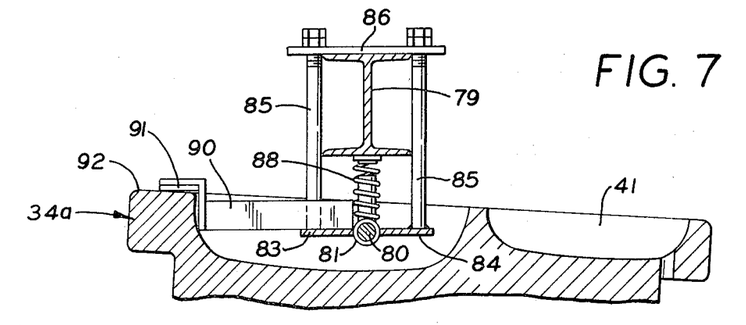
FIG. 7—included on the same sheet of drawings as FIG. 14—is an enlarged cross section taken substantially on line 7—7 of FIG. 3 and depicting the interconnection between the core and head bar on the carriage.

A plurality of multi-piece molds 30 may be mounted on a carriage 40, and a plurality of the improved carriages 40 may be incorporated into a system of the type taught by my prior United States patent, No. 3,189,971. So incorporated, the multiple piece molds may be filled with slip by an apparatus, and according to the method, taught by my prior United States patent, No. 3,190,494. The elimination of air entrainment in the slip as a result of filling the mold may be achieved by the use of slip wells 41 (FIGS. 4 and 7) of the type taught by my prior United States patent, No. 3,212,156.

It should also be appreciated that to facilitate removal of the upper core 34 subsequent to the cast, the core 34 may be dusted on apparatus, and according to the method, taught by my prior U. S. Pat. No. 3,409,456.

Figure 4:
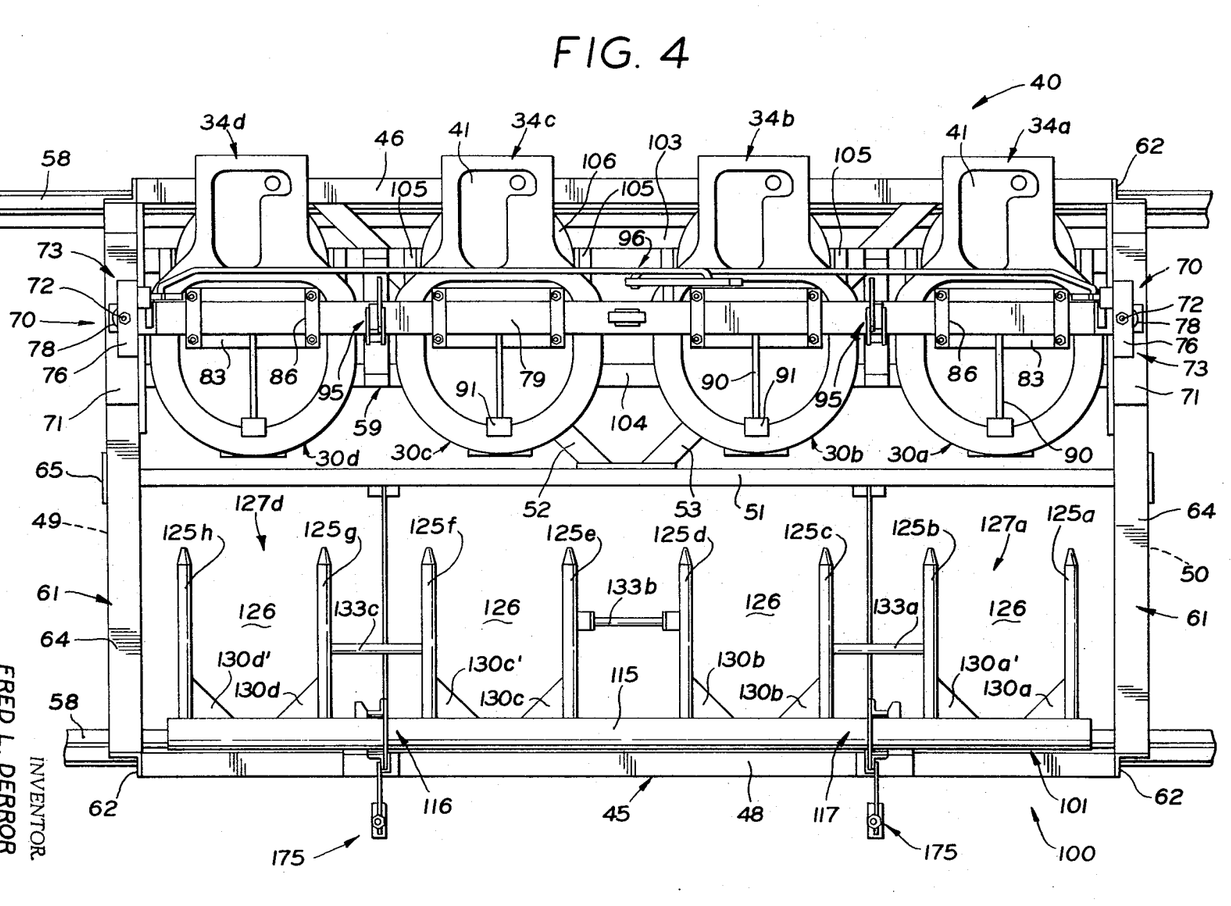
FIG. 4 is a top plan of the carriage depicted in FIG. 3.

Referring more particularly to FIGS. 3, 4 and 5, the carriage 40 has a frame 45 which is preferably of rectangular shape with longitudinal side members 46 and 48 joined by laterally extending primary end members 49 and 50. Suitable structural stiffening members, such as the longitudinally aligned center bar 51 connected between end members 49 and 50 and the cross braces 52 and 53 joined between the side member 46 and the center bar 51, are desirable to impart rigidity to the frame. Wheel means, such as the wheels 55 rotatably mounted in each of the brackets 56 dependingly secured to the under portion of frame 45 at each of the four corners thereof, are provided to permit the carriage 40 to be moved longitudinally along the track 58.

A table 59 having approximately one-half the width for lateral dimension of the frame 45 is mounted on the upper side thereof. At each longitudinal end of the table 59 are a pair of flanged wheels 60 which rollingly engage the upper surfaces of the primary end members 49 and 50 to permit the table 59 to be moved laterally from one side of the frame to the other. The details of the rolling engagement between the table 59 and the end member 50 of frame 45 are best depicted in FIG. 6.

An upward extension of the frame is provided at each longitudinal end of the frame. Each frame extension comprises a secondary end member 61 that is secured to frame 45 so as to lie parallel to and above the primary end members 49 and 50. As shown most clearly in FIG. 5, each secondary end member 61 is secured to the frame by vertical posts 62 which are connected to the frame at each corner. Adequate clearance for the flanged wheels 60 may be afforded by constructing the secondary end member 61 in the cross sectional shape of an angle iron (FIG. 6) having vertically and horizontally disposed flanges 63 and 64, respectively. The horizontal flange 64 on each secondary end member 61 is spaced above the end members sufficiently to provide a vertical clearance for wheels 60 and the vertical flange 63 is aligned with the outer side of the corresponding end member to give horizontal clearance for the wheels 60. A stiffening plate 65 is connected between the medial portions of the primary end member and the corresponding secondary end member to provide added stability to the secondary end member.

A stanchion means, indicated generally by the numeral 70, extends upwardly from each secondary end member 61. The stanchions 70 are longitudinally aligned and are positioned laterally inwardly from longitudinal side member 46 approximately one-quarter of the lateral dimension of the frame 45 to permit the table 59 to be centered on the stanchions when positioned at one side of the frame and to be completely clear thereof when positioned on the laterally opposite side of the frame.

In the embodiment depicted in the drawings, and as best seen in FIG. 5, each stanchion 70 has a base bracket 71 generally in the shape of an inverted "U" secured to the upper side of the secondary end members 61. Extending vertically upwardly from the base bracket 71 is a bearing slide shaft 72. The vertical slide shaft 72 is rigidly supported at its uppermost extremity by an inverted "U" shaped brace 73, also extending upwardly from the base bracket 71, with legs 74 and 75 parallel to and positioned on either side of the shaft 72 and the cross bar 76 of the "U" secured to the shaft 72.

Slidably embracing each shaft 72 is a lineal bearing housing 78, one of which is attached to each end of the head bar 79. The head bar 79 is aligned longitudinally of the carriage between the stanchions 70 and is, in the preferred embodiment, constructed of a wide flanged beam to obviate deflection, especially during the core locking or extraction processes.

The carriage 40, as heretofore described, is well known to the prior art by way of my prior U.S. Pat. No. 3,189,971.

Dependingly supported from the head bar 79 are a plurality of upper cores 34 hung in balance pairs. A support rod 80 is secured to the upper portion of each core 34 and rotatably engaged by a pair of spaced collars 81 and 82 interconnected by wing plates 83 and 84. The wing plates 83 and 84 are dependingly supported from the head bar 79 by a plurality of bolts 85 hung from top plate 86. The effective length of the bolts 85 may be controlled to facilitate extraction of the cores 34, as explained in greater detail in my prior U.S. Pat. No. 3,189,971.

A pair of compression springs 88 and 89 are interposed between the respective collars 81 and 82 on the head bar 79 to compensate for any variation between the dimensional fit of the various cores 34 supported from the head bar 79 and the side portions 32 and 33 in which they are received and yet provide a suitable locking pressure to a plurality of molds 30 by a common clamping means more fully hereinafter described.

A swing arm 90 is affixed to and extends transversely outwardly from wing plate 83. A positioning tab 91 on the outer end of the swing arm 90 engages the rim 92 of the core 34 to provide a three point support to the core 34—the opposite ends of support rod 80 comprising the other two—when it is exteriorly of the side portions 32 and 33 (as shown in FIG. 5) and also to permit the formation of an underdraft 93 (FIG. 2) on the interior surface of the rearward portion 14a of support web 14.

The underdraft 93 may be formed, and the core 34 withdrawn, by positioning the center of gravity of the core 34 on that side of the support rod 80 oppositely of the positioning tab 91. In that way the core 34 will, when otherwise unsupported, swing about the rod 80 until the rim 92 comes into contact with the positioning tab 91. The relative vertical positions of the rod 80, rim 92 and tab 91 are chosen such that the face 94 on core 34 that forms underdraft 93 will, when the rim 92 and tab 91 are engaged, have been swung to clear the casting and permit facile withdrawal of the core.

The clamping means 95 by which the head bar 79 may be locked into down position when the molds 30 are assembled as well as the latch means 96 by which the head bar 79 may be secured in the up position with the cores 34 extracted from the side portions 32 and 33 of the mold 30 are also both fully described in my aforesaid U.S. Pat. No. 3,189,971.

Before explaining the inversion mechanism it should be appreciated that when the multiple pieces of the mold are assembled the side portions 32 and 33 are retained in position by the interaction of the foot 31 and the core 34 therewith. Specifically, a plurality of dowel means 98 (FIG. 5) may be employed between the upper core 34 and the side portions 32 and 33, and a pair of upwardly directed retaining flanges 99 (FIG. 3) on the foot portion 31 embrace the lower edges of the side portions 32 and 33. Thus, when the four parts of the mold are assembled, and even after the core 34 has been extracted, the lateral position of the side portions 32 and 33 is maintained.

With this background, the operation of the inversion mechanism, indicated generally by the numeral 100 (FIG. 10) will be more fully appreciated.

The inversion mechanism 100 comprises a roll means 101 and a turning device 102. The roll means 101 cooperates with the side portions 32 and 33 of the mold 30 supported on the laterally positionable table 59. The foot portion 31 of each mold is secured to the table 59. The base 106 (FIG. 4) of each foot 31 may rest on the longitudinal side members 103 and 104 of the table 59 and a pair of longitudinally spaced, laterally oriented tie plates 105, which may be in the form of the angle irons depicted, are secured between the side members 103 and 104 of the table 59 and the base 106 of each foot 31 by conventional means not shown.

When the table 59 is positioned on that side of the carriage frame 45 where it is in alignment with the longitudinally opposed stanchion means 70, as shown in FIG. 4, an upwradly directed force may be applied to the lift post 109—as through ring 110—secured to the head bar 79 to extract the cores 34. When the cores are raised sufficiently to clear the remainder of the molds, the latch means 96 is actuated to maintain the head bar 79, and cores 34, in this "up" position.

For ample working clearance to apply the flush ring 20 and the "pipe" comprising the internal walls 16, 18 and 19, it may be well to shift the table 59 laterally across the frame 45 to a position wholly clear of the head bar 79 and cores 34. It is also in this position that the side portions 32 and 33 of each mold 30 carried on the table 59 cooperatively engage the roll means 101 of the inversion mechanism 100.

Figures 8, 9:
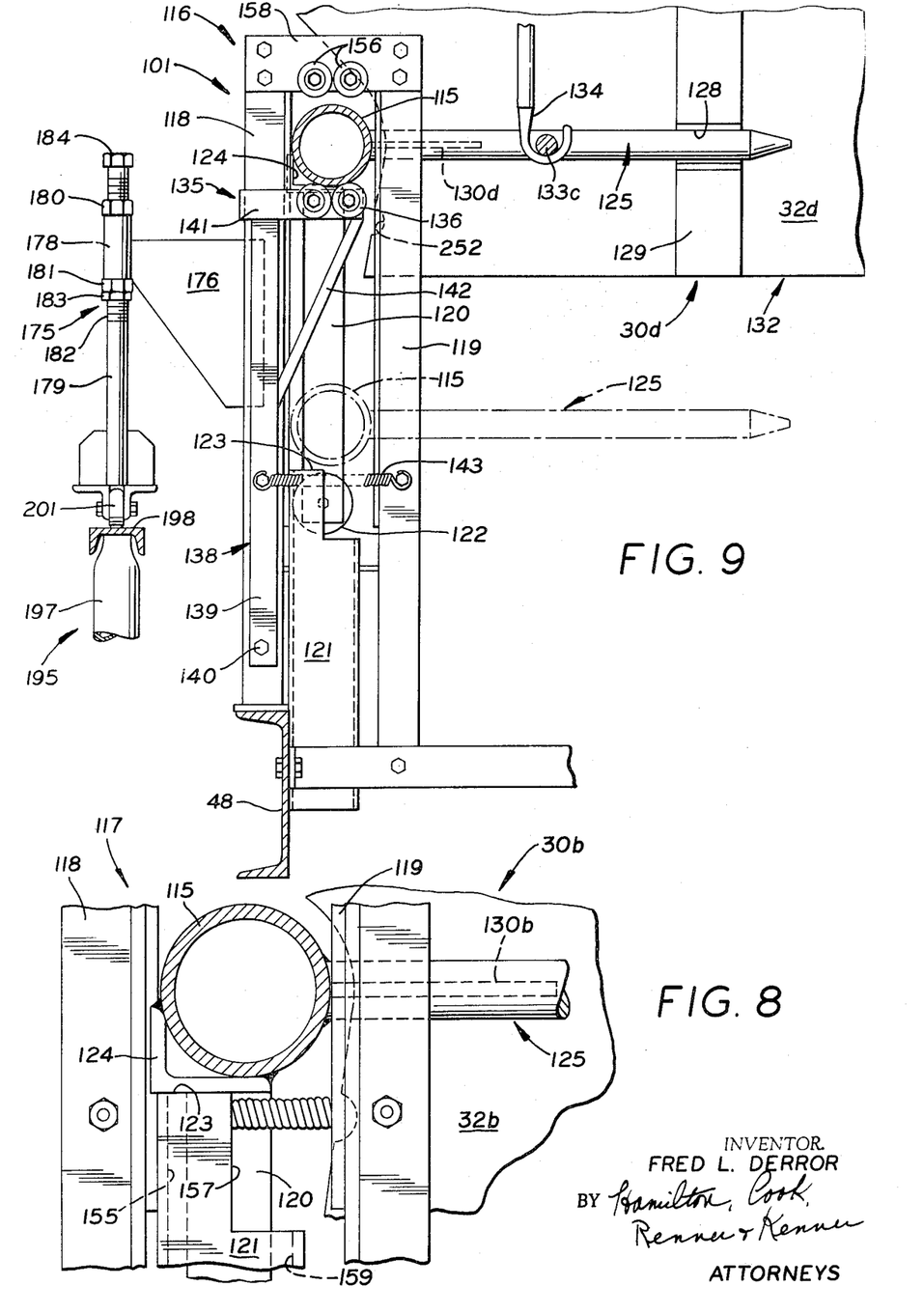
FIG. 8 is an enlarged cross section taken substantially on line 8—8 of FIG. 3.
FIG. 9 is an enlarged cross section taken substantially tude than FIG. 8—cross section taken substantially on line 9—9 of FIG. 3 and representing, a chain line, the roll bar and tyne as disposed in FIG. 3, and further representing, in solid line, the roll bar, tyne and support means of the inversion mechanism as disposed in FIG. 5.

In general, the roll means 101 (as best seen in FIGS. 8 and 9) comprises a roll bar 115 extending between, and preferably through, longitudinally spaced support means 116 and 117. Each support means has vertical guide plates 118 and 119 that are laterally spaced with respect to each other only sufficiently to confine the roll bar 115 therebetween and yet permit it to slide vertically and roll about its own axis, as more fully hereinafter explained.

A pair of locator arms 120 extend radially of the roll bar 115 and are adapted to be captured within corresponding boxed guides 121 supported from the side member 48 of carriage frame 45. A roller 122 mounted on the end of each locator arm 120 provides a friction minimizing contact between the locator arms 120 and their boxed guides 121, for a purpose more fully hereinafter related. The upper edge 123 of each guide 121 constitutes a primary rest means that delineates a lower position for the bar 115, and thus, roll means 101. To provide ample surface area on roll bar 115 for contact with the primary rest means 123 an abutment member 124, that is preferably in the form of an angle iron, may be secured to the bar 115.

Also extending radially of the roll bar 115 are a plurality of tyne members 125. The alternate spaces 126 between successive tynes 125 are open (FIG. 4) so that successive pairs of tynes, as tynes 125a–125b; 125c–125d; 125e–125f; and, 125g–125h, form fork means 127a–127d, inclusive, to engage the mating side portions 32 and 33 of the respective molds 30a through 30d. Specifically, the tynes 125 are received within notches 128 presented in a web 129 on the outer surface of each side portion 32 and 33. That is, the tyne 125a is received within notch 128 on side portion 32 of mold 30a and the tyne 125b is received within the notch 128 on the side portion 33 of the same mold 30a, etc.

A gusset plate 130 is secured between each tyne 125 and the roll bar 115 for coaction with a slot 131 in the corresponding side portion 32 or 33 engaged by that tyne. Here too, for example, the gusset plate 130c engages slot 131c in side member 32 of mold 30c and gusset plate 130c' engages slot 131c' in side member 33 of mold 30a.

The spacing of the tynes 125 in each fork means 127—longitudinally with respect to the carriage 40—and the cooperative fit between not only the tynes and their respective receiving notches 128 but also the gusset plates 130 and their respective slots 131, hold the side portions 32 and 33 securely together in fixed relation with respect to the roll bar 115. With the side portions 32 and 33 maintained thus contiguous as a cradle 132 to provide the sole support for a casting nestled therein, the restraining flanges 99 presented from the foot portion 31 to embrace and maintain the side sections together are no longer required, and the cradle 132—with the casting nestled therein—may be lifted off the foot 31.

The adjacent tynes 125 between successive fork means 127 are joined by stirrup rods 133. The stirrup rods 133a and 133c provide a modicum stiffening function for the adjacent tynes joined thereby but more important provide a means located in a plane spaced outwardly of the roll bar 115—but not as far outwardly as the center of gravity of the load supported by the roll bar 115—to which an upwardly directed force may be applied to elevate the cradles 132 and lift them off their respective foot portions 31.

A pair of hooks 134, for example, may engage the stirrup 133a extending between tynes 125b and 125c and the stirrup 133c extending between tynes 125f and 125g, respectively, and apply an upwardly directed force thereagainst. Even though this upwardly directed force is not located exactly in the plane of the center of gravity and even though this force is applied eccentrically of the roll bar 115, the cooperative interaction of the locator arms 120 and their respective boxed guides 121 force the roll bar 115 and all components attached thereto or supported thereby to move vertically along the path delineated by the guide plates 118 and 119 in the support beams 116 and 117.

When the cradles 132 of the various molds 30 carried on the forks 127 of the roll means 101 are elevated sufficiently to clear the corresponding foot portions 31, a secondary rest means 135—spaced vertically upwardly of the primary rest means 121—positions itself generally between the guide plates 118 and 119 of each of the support means 116 and 117 to retain the roll bar 115 in its elevated position.

As best seen in FIG. 9, the secondary rest means 135 may comprise appropriate rollers 136 carried on a pair of longitudinally spaced gate means 138 that may be mounted on the respective support means 116 and 117. Each gate means 138 has a columnar member 139 mounted to swing about a pivot point such as the bolt 140 by which the columnar member 139 is attached to the guide plate 118. A shoulder member 141 extends generally perpendicularly from the end of the columnar member 139 opposite the pivot point 140 and is braced by a cam rod 142 that extends between the columnar member 139 and a point on the shoulder member 141 outwardly of the columnar member 139. A biasing means, such as the spring 143 connected between the columnar member 139 and the guide plate 119, urges the rest means 135 to a position where it spans between the guide plates 118 and 119. A stop hook 144 (FIG. 5) extending outwardly of the columnar member 139 may engage the guide plate 118 to limit the biasing effect of spring 143 and to impart stability to the secondary rest means 135 in a direction parallel to the axis of the roll bar 115.

Thus, as the roll bar 115 is elevated upwaardly of the primary rest means 123 it contacts the cam rod 142 to swing the secondary rest means 135 arcuately away from its position between the guide plates 118 and 119 and thereby permits the roll bar 115 to be elevated to a higher level. As the roll bar 115 clears the elevation of the rollers 136 and shoulder 141 on the secondary rest means 135, the spring 143 biases the gate means 138 to swing the rest means 135 back into its supporting position between the guide plates 118 and 119. A relaxing of the upwardly directed force applied by the hook means 134 will seat the roll bar 115 against the rollers 136 to transfer the weight of the roll bar 115, and everything supported thereon, to the secondary rest means 135.

With the weight of the castings supported in the cradles 132 at an elevated position above the foot portions 31 of the molds 30, the table 59 to which the foot portions 31 are secured may be shifted laterally to the opposite side of the carriage 40. This is desirable only insofar as it assists in distributing the weight balance on the carriage through the subsequent step of inverting the cradles.

After the cradles 132 have been elevated to withdraw them from the foot portions 31 of the molds 30, they are inverted preparatory to the removal of the castings therefrom. It must be appreciated that even though the internal surfaces of the side portions 32 and 33 forming the cradle 132 impart the exterior surface of the shell 10, the dehydration of the slip during the green cast does occasion a predetermined shrinkage in the casting so that after the foot portion 31 is withdrawn the weight of the casting is supported only on the upwardly directed surfaces within the side portions 32 and 33 of the mold 30. For the shell 10 depicted that would mean that the major portion of its wegiht is carried on the downwardly directed surface 145 of the bowl portion 12 outwardly of the supporting web 14 and the small downwardly directed surface 146 on the rearward portion 14a of the support web 14.

Thus, during an inversion of the cradle 132 the casting nestled therein will, because of tis prior shrinkage, shift within the cradle until the weight thereof is fully supported only on the upwardly directed surfaces within the cradle after it is inverted. That is, with the cradle 132 inverted the major portion of the weight of the shell is carried on the then downwardly directed surface 148 of the support web 14 and the similar surface 149 on the rearward portion 14a thereof. The weight transfer occasioned by the inversion of the cradle must be smoothly accomplished or else the fragile casting nestled therein will fracture, or be otherwise damaged.

It has been found that the inversion can be smoothly accomplished by a relatively uncomplicated turning device 102, the geometry of which can harness the center of gravity of the load carried on the roll bar 115 to assist in smoothly inverting the cradle 132 with the casting nestled therein as well as smoothly reutrning the cradle after the casting has been removed.

Figures 10, 11:
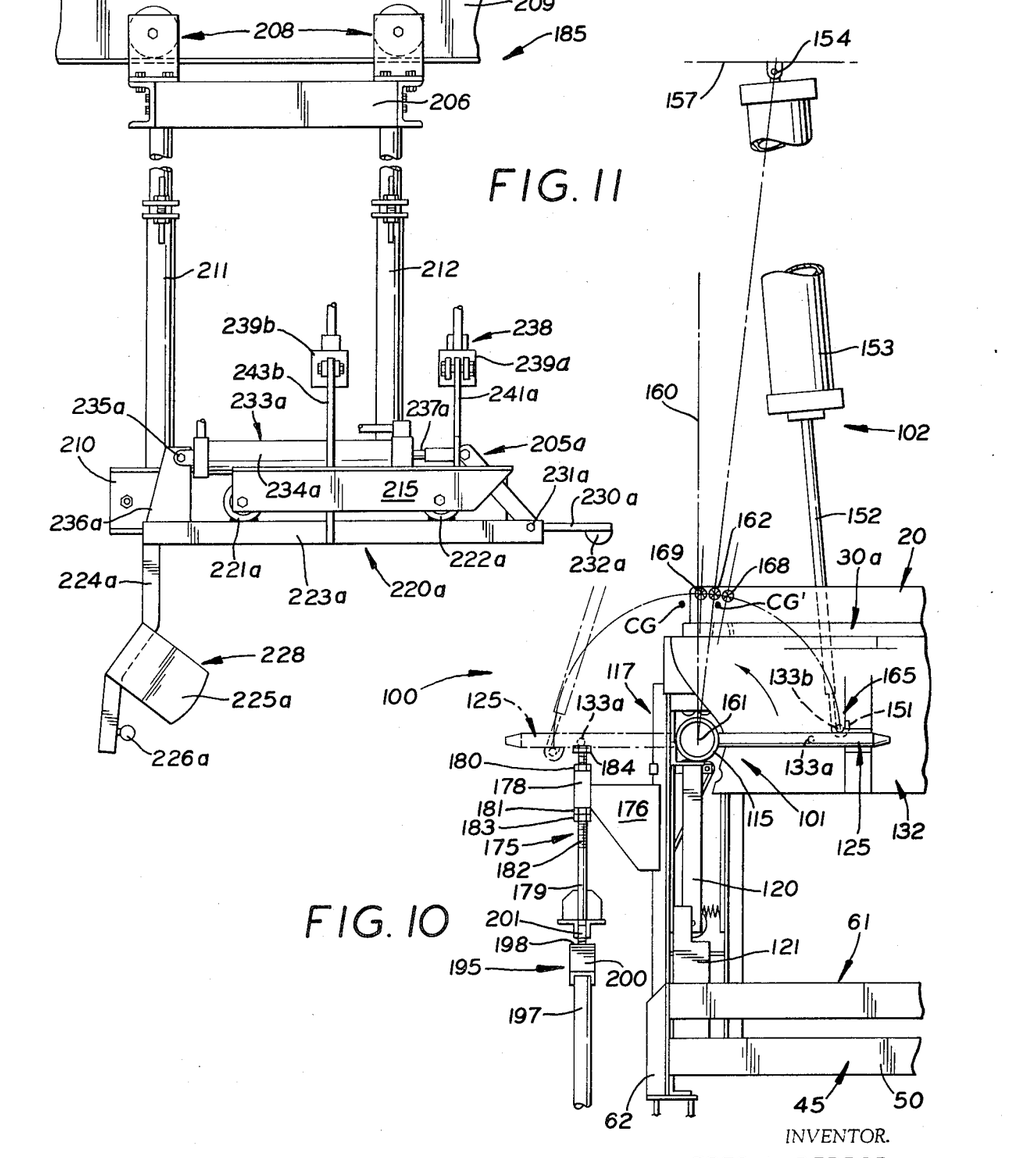
FIG. 10 is a partial area similar to FIG. 5 depicting, in solid line, the roll means operatively connected to the turning device prior inversion, and in chain line, subsequent to the inversion.
FIG. 11 is a side elevation of the transfer mechanism presenting the gripper means in the "ready" position.

Reverting to FIG. 10, the turning mechanism 102 may comprise a hook, or coupling means, 151 carried on the end of a piston rod 152 actuated by a piston (not shown) slidably received within a cylinder 153 swingingly supported from a pivotal mount 154 presented upwardly of the carriage 40—and roll means 101—but in a particular geometric relation therewith that is more fully understood by an explanation of the actual inversion process.

To invert the cradle 101, the hook 151 engages, for example, the stirrup 133b extending between tynes 125d and 125e and the cylinder 153 is actuated to retract the piston rod 152. In response to this upwardly directed force, the eccentric load—therefore statically stabilized by contact of the locator arms 120 against the reaction pad formed by the laterally outer wall 155 in each of the boxed guides 121—is rotated about the axis of the roll bar 115 which freely turns within the bearing assembly formed by the circumferentially spaced rollers 136 on the secondary support means 135 and the opposed rollers 156 mounted on the cross plate 158 secured between the upper extremities of the guide plates 118 and 119. The laterally inner wall 159 on each of the boxed guides 121 is relieved, as at 157, to permit the locator arms 120 to swing clear thereof.

At this point it should be appreciated that the center of gravity of the weight supported on roll bar 115 is preferably located outwardly of the stirrups 133a and 133c so that when the roll means 101 is raised to the elevated position by hooks 134—and particularly just prior to the time that it is supported on the secondary rest means 135—it will not prematurely rotate as the locator arms 120 reach the relieved portion 157 of the boxed guides 121. In short, it is most advantageous to have the weight distribution, during elevation of the roll means 101, such that any tendency toward rotation occasioned by the resultant moment applied to the roll bar 115 by any imperfect balance between the lift force imparted by hooks 134 and the weight supported on the roll bar can be precluded by engagement of the locator arms 120 with the outer walls 155 of the boxed guides 121.

Returning now to the discussion of the inversion process, the location of the stirrup 133b with respect to the center of gravity of the weight supported on the roll bar 115 is far more subtle.

With the pivotal mounting 154 spaced laterally inwardly of the carriage 40 with respect to a reference plane 160 that extends vertically through the axis 161 of the roll bar 115, the roll bar 115, and the load supported thereon, can be rotated by the hook 151 only until the stirrup 133b reaches its dead center position 162 in alignment with the pivotal mounting 154 and the axis 161 of roll bar 115. However, by locating the notches 128 and the slots 131 on the side portions 32 and 33 comprising the cradles 132 and the stirrup 133b in an interrelated position, the forks 127 will be positioned with reespect to the center of gravity of the load supported on the roll bar 115 such that when the roll bar 115 has been rotated by movement of the stirrup 133b to the dead center position 162, the center of gravity of the load will lie outwardly of the reference plane 160, as indicated by the point CG on FIG. 10. The load on the roll bar 115 will then become the force by which inversion is completed, and the controlled application, or release, of fluid pressure to cylinder 153 will provide a retarding force to effect continued smooth inversion. Admission and release of pressurized fluid to cylinder 153 can be accomplished by limit switches propitiously located within the swing range of cylinder 153, but are not shown because their location is deemed to be within the skill of one versed in the art who has had the benefit of the subject disclosure.

Although in the sequence of operatiion the roll means 101 is not yet ready for retroversion, consideration may well be given at this point as to how the roll means can accomplish retroversion when the stirrup 133b is returned to the dead center position 162. It has been found that the load carried on the roll bar 115 can also be harnessed to accomplish the desired movement in the reverse direction. Although the center of gravity CG was located outwardly of the reference plane 160 when the castings were nestled within the cradles 132, it has been found that the proper interrelation between fork means 127, the cradle 132 and the stirrup 133b will position the center of gravity of the load supported on the roll bar 115 after the castings have been removed inwardly of the reference plane 160, as indicated by CG' in FIG. 10.

It is highly desirable that some tolerance be incorporated as to when the center of gravity passes through the reference plane 160. Otherwise, the minor variations from mold to mold or casting to casting could result in a failure to achieve the necessary disposition of the center of gravity with respect to the reference plane 160 when the operative connection, indicated generally by the numeral 165—i.e., the hook, or coupling means, 151 engaging the stirrup 133b—between the roll means 101 and the turning device 102 reaches dead center. The tolerance necessary to assure both inversion and reversion can be achieved by having the center of gravity pass the reference plane 160 during inversion when the operative connection reaches inversion transfer point 168 and by having the center of gravity pass through reference plane 160 during reversion when the operative connection reaches reversion transfer point 169. In the environment with which the subject concept is disclosed, positioning of the inversion transfer point 168 approximately 5° in advance of the dead center position 162 during inversion and positioning the reversion transfer point 169 5° in advance of the dead center position 162 during reversion, allows the center of gravity to pass through the reference plane 160 in advance of the time that the operative connection 165 reaches dead center, and thereby assures the desired rotation of roll bar 115 but does not occur sufficiently in advance of the dead center position 162 that a shock loading will be applied to the casting as a result of the function shift in the turning device 102 from a lifting means to a retarding means.

Recapitulating then, the pivotal mounting 165 securing the turning device 102 to an overhead support 157 is located upwardly of the stirrup 133b to which the turning device 102 is operatively connected and laterally of the vertical reference plane 160 within which the axis 161 of the roll bar 115 lies. The disposition of the cradle 132 with respect to the roll means 101 is selected such that when the casting is nestled within the cradle the center of gravity of the weight being inverted by the roll means 101 lies on the side of said reference plane 160 opposite to the stirrup 133b, at least when said pivotal mounting 154, roll bar axis 161 and the engaged coupling means 151 and stirrup 133b are aligned. By the same token, when the casting is absent from the cradle 132, the center of gravity of the weight being rotated by the roll means 101 lies on the same side of the reference plane 160 as the stirrup 133b, again, at least when the pivotal mounting 154, roll bar axis 161 and the engaged members of the operative connection 165 are aligned.

Returning now to the sequence following the actual inversion, an outrigger means 175 cooperates with the roll means 101 to assure precise vertical orientation thereof for the subsequent operation. As best seen in FIGS. 9 and 10, a wing plate 176 extends laterally outwardly of each support means (117, as shown) and carries a collar 178. A vertically oriented stop post 179 is slidably received within the collar 178 and a pair of indexing nuts 180 and 181 are carried on a threaded portion 182 of the stop post 179 to embrace the opposed ends of the collar 178. The stop post 179 can be positioned selectively with respect to the collar 178 by adjusting the location of the indexing nuts 180 and 181 therealong and tightening them against the collar 178. A lock nut 183 secures the position of the indexing nut 181 and thus the stop post 179.

The upper extremity of the stop post 179 terminates in a contact head 184. When the roll bar 115 is inverted, the contact heads 184 on the two stop posts 179 will engage the stirrups 133a and 133c to define the exact position of the fork means 127 with respect to the carriage 40. However, the transfer means 185 by which the castings are removed from their nestled support in the cradles 132 and deposited on the receiving locus 190 is mounted exteriorly of the carriage 40, and, because the transfer means 185 must engage the side portions 32 and 33 in the mold 30 with some degree of precision, it is also important that the fork means 127 be positioned accurately with respect to a reference exteriorly of the carriage 40. This necessity is further augmented by the fact that when the roll bar 115 is rotated to invert the fork means 128 and the cradles supported therein, the weight carried by the roll bar 115 is cantilevered with respect to the carriage 40. As this loading changes—even in response to removal of the castings—a resulting vertical displacement of the fork means could be effected. It has, therefore, been found to be highly desirable to provide a second locator means 195 by which the precise vertical positioning of the fork means 127 with respect to a reference exteriorly of the carriage 40 can be assured.

Figure 12:
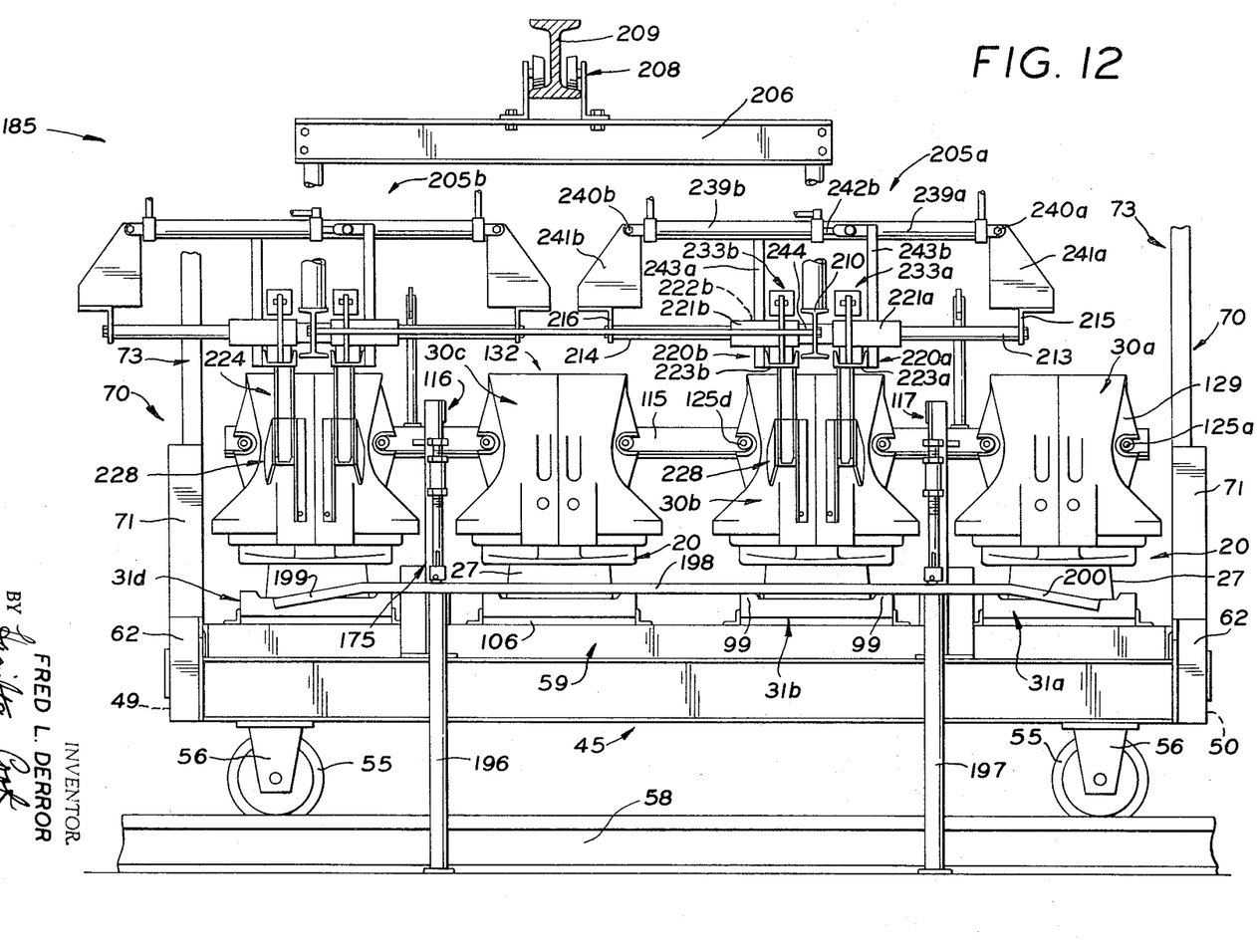
FIG. 12 is a rear elevation of the transfer means depicted in FIG. 11 with the gripper means thereon moved into the "engaging" position with a pair of alternate cradles on the carriage.

A preferred form of the second locator means 195 is best depicted in FIGS. 9, 10 and 12. A pair of risers 196 and 197 extend upwardly from the floor laterally of the track 58 and carry a runner 198 having downwardly curved ends 199 and 200 that form lift guides.

A roller means 201 is presented on the lower extremity of the stop post 179. Engagement of the roller means 201 with the runner 198 effects a controlled positioning of the fork means 127, when inverted, with respect to a reference exteriorly of the carriage 40. In order to assure that a modest reduction of the load carried by the fork means 127 will not allow the roller means 201 to lift off the runner 198, the runner 198 is slightly elevated so that a substantial portion of the load normally supported by track 58 is transferred to the runner 198 of the locator means 195. This load transfer is accomplished with facility as the carriage is moved along the track 58. Specifically, the roller means 201 on the stop posts 179 successively engage and ascend the lift guide formed by the downwardly curved first end 199 of runner 198. Then, as the carriage leaves the station denominated by contact of the roller means 201 with the runner 198 of locator means 195, the load is transferred back to track 58 as the roller means 201 descend the lift guide formed by the downwardly curved, second end 200.

When the inverted fork means 127 is thus secured in a vertically controlled position, gripper means 205 carried on the transfer means 185 grasp the side portions 32 and 33 forming cradles 132 and gently deposit the castings nestled therein on the receiving locus 190. When multiple fork means 127 are employed in relatively close proximity, it has been found quite efficient to employ staged removal of alternate castings. When four fork means 127 are employed, as depicted, the first and third cradles 132a and 132c may be removed in one operation, and the second and fourth cradles 132b and 132d may be removed in a second operation.

Turning now to a description of the transfer means 185 the basic module for a transfer means comprises a pair of gripper means 205a and 205b supported from a single carrier frame 206, as shown in FIG. 12. The carrier frame 206 may be dependingly supported beneath a wheel mount 208 movable along a monorail 209 that extends generally transversely of the track 58.

The two gripper means 205a and 205b are spaced to cooperate with the cradles carried on alternate fork means 127. As such, several installational variations may be employed to accomplish a transfer of all four cradles from the carriage depicted to the receiving locus 190— the selection depending largely on personal preference and the cycle time during which it is desired to retain a carriage 40 at any one station. For example, a separate carrier frame 206 may be employed for each alternate pair of cradles. With this approach the two separate carrier frames that would be required to transfer all four cradles supported on a carriage 40 of the type depicted could be located at two separate stations to which the carriage is sequentially moved.

It might be alternatively desirable to use only a single carrier frame 206 and have it index at two locations with respect to the carriage. This indexing might well be accomplished by employing a secondary rail means (not shown) supported beneath the wheel mount 208 and oriented substantially parallel to the carriage 40. The carrier frame 206 could then be shiftable along the secondary rail means to index at two locations with respect to the carriage 40. As an additional variation, the carriage itself could be indexed to two positions with respect to a single carrier frame.

Irrespective of the particular installational variation actually employed, the two gripper means 205a and 205b employed are preferably of identical construction so that only gripper means 205 need be described in detail.

Gripper means 205a, as best seen in FIGS. 11 and 12, has a center beam 210 rigidly mounted in spaced relation beneath the carrier frame 206, as by rigid, vertically adjustable hanger bars 211 and 212. A pair of spaced guide rods 213 and 214 are secured to, and extend transversely in both directions from, the center beam 210. The ends of the guide rods 213 and 214 outwardly with respect to the center beam 210 are interconnected by tie plates 215 and 216, one on each side thereof.

Tong means 220a and 220b are supported on the guide rods 213 and 214, one tong means on each side of the center beam 210. Tong means 220a is supported by a collar 221a slidably received on the guide rod 213 between the center beam 210 and the tie plate 215 and a similar collar 222a slidably received on guide rod 214 between the center beam 210 and the tie plate 215. Likewise, tong means 220b is supported by a collar 221b slidably received on the guide rod 213 between the center beam 210 and the tie plate 216 and a similar collar 222b slidably received on the guide rod 214 between the center beam 210 and the tie plate 216.

The body portion of tong 220a comprises a bracket 223a secured between collars 221a and 222a, and the body portion of tong 220b comprises a parallel bracket 223b secured between collars 221b and 222b. At the rear (with respect to the frame of reference afforded by proximity to the carriage 40 and therefore to the left in FIG. 11) of brackets 223a and 223b, legs 224a and 224b extend downwardly and each present a flange 225 and an interlock button 226. The flanges 225a and 225b on legs 224a and 224b, respectively, are spaced laterally of the two interlock buttons 226a and 226b in order to form a combined shoe means 228, for a purpose more fully hereinafter described.

A clamp arm 230a is mounted to swing about a pivot pin 231a on the front of bracket 223a. A semicylindrical clamp bar 232a is secured to arm 230a on one side of the pivot pin 231a and a first actuating means 233a is secured to arm 230a on the other side of the pivot pin 231a. The first actuating means 233a swings clamp bar 232a selectively toward and away from the interlock button 226a to which it is opposed. An identical arrangement may be employed on bracket 223b for operation by first actuating means 233b.

Specifically, the first actuating means, an epitomized by actuating means 233a, best seen in FIGS. 11 and 12, may comprise a cylinder 234a mounted, as by hinge means 235a to the pedestal plates 236a secured to, and extending upwardly from, the rear of bracket 223a. The extensible and retractable rod 237a is secured, at one end, to the double-acting piston (not shown) slidably received within the cylinder 234a and, at the other end, to the clamp arm 230a for swinging the clamp bar 232a toward and away from the opposed interlock button 226a.

The tongs 220a and 220b, as thus described, are also selectively movable toward and away from each other along the guide rods 213 and 214 by a second actuating means 238. The second actuating means 238 may comprise cylinders 239a and 239b mounted, as by hinge means 240a and 240b, to anchor plates 241a and 241b that extend upwardly of the tie plates 215 and 216, respectively. The extensible and retractable rods 242a and 242b are secured, at one end, to the double acting pistons (not shown) slidably received within the cylinders 239a and 239b and, at the other end, to extension arms 243a and 243b that project upwardly from the tongs 220b and 220a, respectively. Suitable control means are provided to synchronize the operation of the first and second actuating means 233 and 238 to effect the operation hereinafter described, but such devices are well within the ability of those skilled in the art and they are not, therefore, described in detail herein.

Turning now to the operation of the transfer means 185, a full understanding may be acquired from a detailed discussion of the operation of only one gripper means 205. Let us begin, then, with the transfer means 185 in the "ready" position.

In the "ready" position, the tong means 220a and 220b are "juxtaposed." That is, the second actuating means 238 will have moved them as close to each other as possible. To assure precise spacing of the tong means a stop sleeve 244 may be secured to each guide rod 213 and 214 on each side of the center beam 210 against which the various collars 221 and 222 will abut when the tongs 220a and 220b are "juxtaposed."

In the "ready" position of the transfer means 185 the individual tong means 220a and 220b are also "open." That is, the first actuating means 233 will have swung the clamp arms 230a and 230b counterclockwise as shown in FIG. 11 so that the clamp bars 232a and 232b are in substantial alignment with the brackets 223a and 223b.

Figure 13:
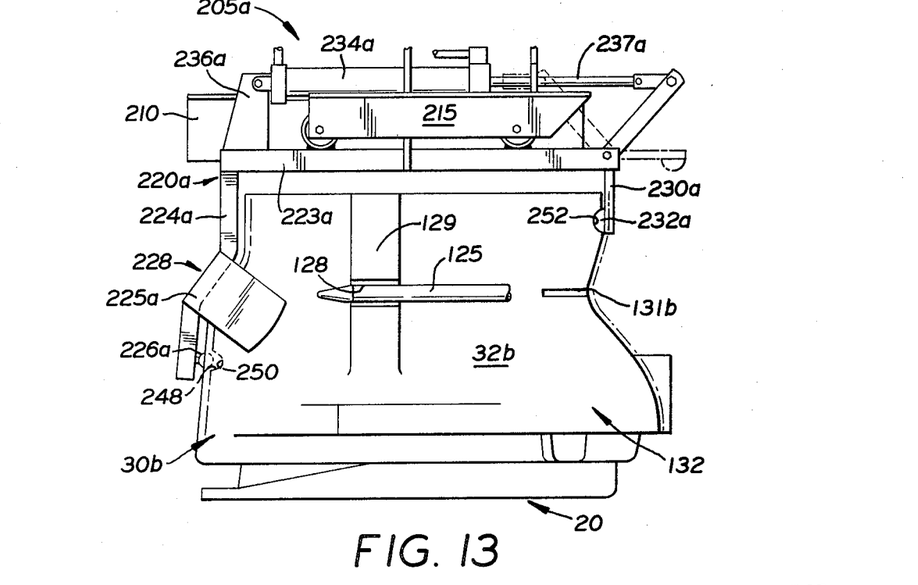
FIG. 13 is a side elevation of the gripper means shown in FIG. 11 depicting, in chain line, the tong means in the "engaging" position and, in solid line, the tong means "locked" onto a cradle.

In the "ready" position the gripper means 205 is supported laterally of the track 85 by the carrier frame 206 which is, in turn, movable along the monorail 209. When the carriage 40 is longitudinal registry with the gripper means and the cradles 132 are inverted in precise vertical disposition, as heretofore described, the carrier frame 206 is moved along the monorail 209 until the gripper means 205 is in the "engaging" position depicted by the chain line representation in FIG. 13. This movement of the carrier frame 206 may be manually effected or it may, with equal facility, be fully automated.

In the "engaging" position, the flanges 225a and 225b forming the shoe means 228 embrace, opposed contact surfaces 245 and 246 on the respective side portions 32 and 33 forming cradle 132. At the same time, the interlock buttons 226 will engage at least the flared mouth portions 248 of the interlock sockets 250 on the respective side portions 32 and 33.

After the gripper means 205 has been moved into the "engaging" position, the second actuating means 238 effects the "locked" position of the tong means 220a and 220b. That is, as depicted by the full line representation in FIG. 13, the semicylindrical clamp bars 232 are forced into the corresponding receiving recesses 252 on the respective side portions 32 and 33 by rotation of the clamp arms 230a and 230b. The pressure applied by the clamp bars fully seats the interlock buttons 226 into the respective sockets 250 and, at the same time, effects a wedging action of the cradle between the flanges 225a and 225b of the shoe means 228 to maintain the side portions 32 and 33 firmly together.

Figure 14:
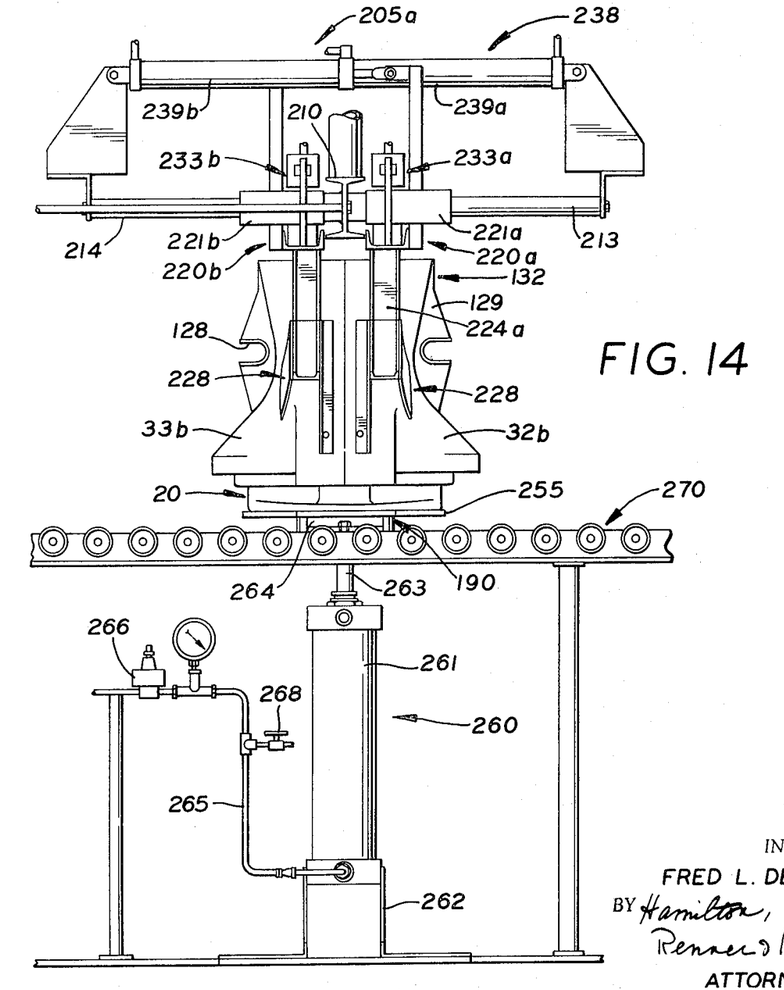
FIG. 14 is a rear elevation of the gripper portion of the transfer means oriented in operative position at the receiving locus; and, FIG. 15 is a partial area of FIG. 14 depicting the tong means on the gripper portion of the transfer means "separated," but still "locked," after having deposited the casting on the receiving locus.

With the tong means 220a and 220b thus simultaneously in the "locked" and "juxtaposed" positions the cradle 132 can be safely removed from the fork means 127 without separation of the side portions 32 and 33 and thus without damage to the casting nestled therein. To remove the cradle 132 from the fork means 127 the carrier frame 206 is moved away from the carriage 40 along monorail 209. The carrier frame is so moved until the gripper means 205 is oriented in operative position at the receiving locus 190, as indicated in FIG. 14.

At the receiving locus 190 (FIGS. 14 and 15) a bat, or face plate, 255 is positioned to have the casting deposited thereon. As is well known to the art, a toilet must be supported upside down on a flat surface during the cure to maintain the top of the bowl flat and prevent distortion resulting from shrinkage stresses. In the inverted position of the cradle the toilet nestled therein is upside down and will, therefore, be properly deposited on the bat. However, a number of conditions exist that militate against a facile deposit of the toilet onto the bat. Of primary consideration is the fact that with the cradle 132 inverted the primary weight of the toilet is carried on the upwardly directed surfaces within the cradle, and, as was noted earlier, this imposes the support reaction solely against the surface 148 of support web 14 and the surface 149 on the rearward portion 14a of the support web. It has been found that if the side portions 32 and 33 are separated when the weight of the toilet is so supported the green casting will be damaged. Accordingly, to deposit the toilet onto the bat 255 the bat must be brought into weight supporting contact with the toilet. However, it has been further found that if the bat 255 lifts the toilet sufficiently to bring the opposed surfaces of the toilet— i.e., the surface 145 on that portion of the bowl 12 outwardly of the web 14 and the downwardly directed surface 146 on the rearward portion 14a of web 14—into contact with the interior surface of the cradle, the casting will also be damaged when the side portions 32 and 33 are separated.

In order to obviate any damage to the casting resulting from separation of the side portions 32 and 33, it is necessary, then, for the bat 255 to assume the full weight of the casting but none of the weight of the cradle in which it has been, to this point, nestled. This "flotation" of the casting within the cradle can be achieved by shifting the weight of the casting from the cradle 132 onto the bat 255 via a modulated lift means 260.

The lift means 260 has a cylinder portion 261 secured to a stationary base 262. A piston (not shown) is slidably received within said cylinder 261 and a piston rod 263 secured thereto extends upwardly of the cylinder 261 and terminates in a platform 264 on which the bat 255 is carried. Fluid is supplied to the cylinder 261 under pressure through a conduit 265 and a regulator 266 is incorporated within the conduit 265 to control the pressure reaching the cylinder 261 so that the lift force applied to the bat 255 exactly equals the weight of the casting deposited thereon. It has been further found that a far more critical force application can be obtained by providing a bleed-off aperture in the form of valve 268 between the regulator 266 and the cylinder 261 so that a modulated, constant, pressurized fluid flow is available to the cylinder 261. With the criticality thus attained, the weight of the casting is fully transferred from the cradle 132 to the bat 255.

Figure 15:
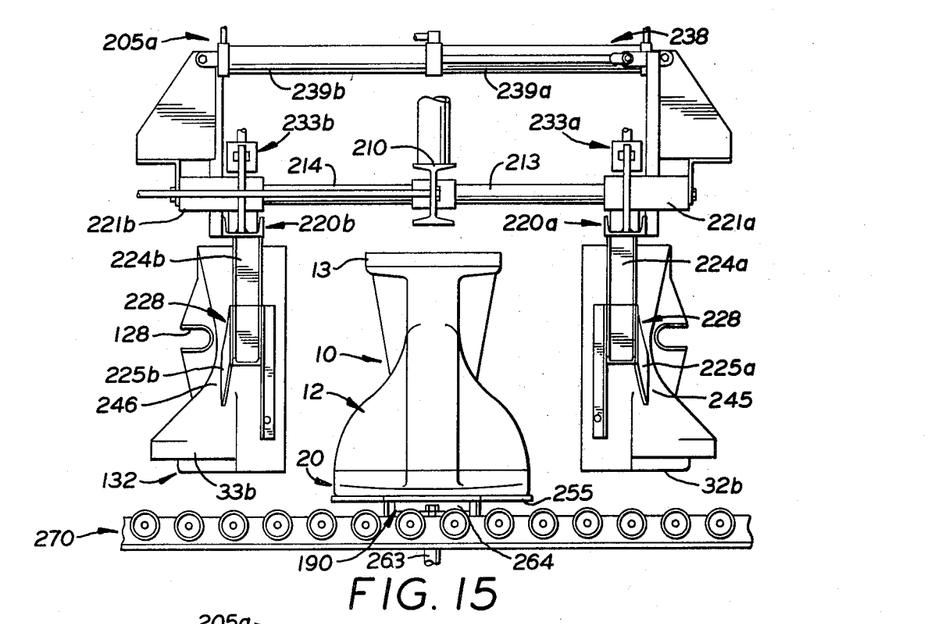

Thereafter, the second actuating means 238 may be operated to separate the gripper means—the tong means 205 remaining locked—in order to separate the side sections 32 and 33, as depicted in FIG. 15. With the sides thus separated, the casting is completely extricated from the mold and the transfer means 185 may be moved along monorail 209 to clear the conveyor 270. After the side sections 32 and 33 are clear of the casting the second actuating means 238 may again be operated to juxtapose the tong means 220 and thereby bring the side sections 32 and 33 together again for repositioning on the roll means 101.

It should be appreciated that the flanges 225 which together form a shoe means 228 to assist in clamping the side sections 32 and 33 together, individually stabilize the sections 32 and 33 when they are separated, as shown in FIG. 15.

After the gripper means 205 clear the conveyor 270 the lift means 260 may lower the bat 255 onto the conveyor and the extricated casting moved on for finishing.

It should thus be apparent that a method and apparatus embodying the concept of the present invention effects facile extrication of a green casting from a multiple piece mold having at least two, opposed, side sections forming a cradle by which the casting may be supported and otherwise accomplishes the objects of the invention.

I claim:

1. In a system for extricating a ceramic shape from a multiple piece mold having at least opposed sections forming a cradle by which the casting may be supported in both an upright and an inverted position, each said cradle section having a receiving notch, an inversion mechanism, said inversion mechanism comprising roll means having a roll bar and spaced tynes secured to said roll bar, said roll bar being mounted in support means, and means for selectively moving said spaced tynes into and out of supporting engagement with the receiving notches on said cradle, and means for rotating said spaced tynes about the axis of said roll bar to invert the cradle.

2. A system, as set forth in claim 1, in which a gusset means is secured between each tyne and the roll bar, each said cradle section provided with a receiving slot, said gusset means matingly interfitting with corresponding receiving slots when the cradle is supported on said engaging means.

3. In a system for extricating ceramic shapes from multiple piece molds having at least opposed sections forming a cradle by which each casting may be supported in both an upright and an inverted position, a plurality of multiple piece molds mounted on a plurality of carriages, each carriage having a frame movable between successive stations in a system for slip casting ceramic shapes, a table on each carriage shiftable laterally thereof, each said multiple piece mold also having a foot mounted on said table, a vertically movable head bar mounted on said carriage upwardly of said table when it is positioned on one side of said carriage, each said multiple piece mold also having a core, said cores supported on said head bar and capable of being extracted from said molds by upward movement of said head bar, releasable interacting means securing the said cradle side sections to the respective cores and feet, a roll bar with engaging means secured thereto supported on said carriage and positioned such that said cradles will interfit with said engaging means when said table is shifted laterally from beneath said head bar to the opposite side of said carriage, and means for rotating said engaging means about the axis of said roll bar to invert the cradle.

4. A system, as set forth in claim 3, in which the cores are dependingly supported from the head bar by a rod means affixed to said core, a hanger means mounted on said head bar and rotatably connected to said rod means, a swing arm secured to said hanger means and extending laterally of said rod means to contact said core, the center of gravity of said core located on the side of said rod means oppositely of said swing bar.

5. A system, as set forth in claim 3, in which first locator means are secured to said roll bar, guide means are secured to said carriage, and cooperative interengagement of said first locator means with said guide means controls the orientation of said engaging means with respect to said cradle.

6. In a system for extricating a ceramic shape from a multiple piece mold having at least opposed sections forming a cradle by which the casting may be supported in both an upright and an inverted position, an inversion mechanism, said inversion mechanism comprising roll means having a roll bar and engaging means secured to said roll bar, said roll bar being mounted in support means provided with spaced first guide means, means for selectively moving said engaging means into and out of supporting contact with said cradle, means vertically to translate said roll bar along said first guide means between a lower and an elevated position, upper rest means cooperative with said first guide means selectively to maintain said roll bar in the elevated position, first locator means secured to said roll bar, and second guide means fixed with respect to said support means, and means for rotating said engaging means about the axis of said roll bar to invert the cradle, the interaction of said locator means and said second guide means permitting said roll bar to be inverted only when said roll bar is maintained in the elevated position by said upper rest means.

7. A system, as set forth in claim 6, in which stirrup means are secured to said roll means and the axis of said roll bar lies within a vertical reference plane, a turning device, a pivotal mounting securing said turning device to an overhead support upwardly of said stirrup and laterally of said reference plane, said turning device having a coupling means for cooperatively engaging said stirrup means and applying an upwardly directed force thereagainst to rotate said roll means, the disposition of said cradle with respect to said roll means being such that when a casting is nestled in said cradle the center of gravity of the weight being inverted lies on the side of said reference plane opposite to the said stirrup, at least when said pivotal mounting, roll bar axis and the engaged coupling and stirrup means are aligned.

8. A system, as set forth in claim 7, in which the disposition of the cradle with the roll means is such that when the casting is absent from the cradle the center of gravity of the weight being rotated about the axis of said roll bar lies on the same side of said reference plane as said stirrup, at least when said pivotal mounting, roll bar axis and the engaged coupling and stirrup means are aligned.

9. A system, as set forth in claim 6, in which a second locator means is located exteriorly of said inversion mechanism to provide a fixed vertical support, and an outrigger means is rigidly interposed between said roll means and the said second locator means when the roll means is inverted.

10. A system, as set forth in claim 9, in which the outrigger means is adjustable for predetermined selection of the precise vertical orientation of said cradle when the roll means is inverted.

11. In a system for extricating a ceramic shape from a multiple piece mold having at least opposed sections forming a cradle by which the casting may be supported in both an upright and an inverted position, an inversion mechanism, said inversion mechanism comprising roll means having a roll bar and engaging means secured to said roll bar, said roll bar being mounted in support means, means for selectively moving said engaging means into and out of supporting contact with said cradle, means for rotating said engaging means about the axis of said roll bar to invert the cradle, a pair of tong means, means for selectively actuating each said tong means to grasp one of the opposed sections of said cradle when inverted and support it during and after removal from said engaging means and until said cradle is positioned to deposit the casting nestled therein on a receiving locus and sequentially to move said tong means away from each other to separate the opposed sections of said cradle.

12. A system, as set forth in claim 11, in which the receiving loccus comprises a bat on which the casting is deposited, a pressure system to bring the bat and casting into such contact that the support for the weight of the casting is shifted from the cradle onto the bat.

References Cited
UNITED STATES PATENTS

| | | | |
|---|---|---|---|
| 2,954,596 | 10/1960 | Fassauer et al. | 25—2 X |
| 3,448,496 | 6/1966 | Arnold et al. | 25—29 X |
| 3,189,971 | 6/1965 | Derror | 25—129 X |
| 3,542,213 | 11/1970 | Gram et al. | 25—29 X |
| 3,448,497 | 6/1969 | Arnold et al. | 25—29 |

J. SPENCER OVERHOLSER, Primary Examiner

B. D. TOBOR, Assistant Examiner

U.S. Cl. X.R.

425—90, 185, 439, 451

UNITED STATES PATENT OFFICE
CERTIFICATE OF CORRECTION

Patent No. 3,671,160            Dated    June 20, 1972

Inventor(s) Fred L. Derror

It is certified that error appears in the above-identified patent and that said Letters Patent are hereby corrected as shown below:

Column 2, line 51, "belt" should read -- belts --. Column 3, line 36, after "cradle", first occurrence, insert -- with the casting nestled therein, adapted further to withdraw the cradle --. Column 4, line 18, "wieght" should read -- weight --; line 35, "the" should read -- then --. Column 5, lines 12 and 13, "Fig. 9 is an enlarged cross section taken substantially tude than FIG. 8" should read -- Fig. 9 is an enlarged--but to a lesser degree of magnitude than FIG. 8 --; line 14, after "representing" "a" should read -- in --; line 20, after "and" insert a comma; line 74, after "mold" insert a comma. Column 6, line 36, after "tion of" insert -- the --. Column 7, line 25, "balance" should read -- balanced --. Column 10, line 35, "tis" should read -- its --. Column 13, line 20, after "on the" insert -- two --. Column 14, line 45, after "means," "an" should read -- as --. Column 15, line 22, after "40 is" insert -- in --.

Signed and sealed this 12th day of June 1973.

(SEAL)
Attest:

EDWARD M. FLETCHER, JR.          ROBERT GOTTSCHALK
Attesting Officer                Commissioner of Patents